US011946318B2

(12) United States Patent
Prosperi

(10) Patent No.: US 11,946,318 B2
(45) Date of Patent: Apr. 2, 2024

(54) CLOSURE SYSTEM

(71) Applicant: CornellCookson, LLC, Mountain Top, PA (US)

(72) Inventor: Milton Prosperi, Mountain Top, PA (US)

(73) Assignee: CornellCookson, LLC, Mountain Top, PA (US)

( * ) Notice: Subject to any disclaimer, the term of this patent is extended or adjusted under 35 U.S.C. 154(b) by 454 days.

(21) Appl. No.: 17/064,076

(22) Filed: Oct. 6, 2020

(65) Prior Publication Data

US 2021/0102428 A1 Apr. 8, 2021

Related U.S. Application Data

(60) Provisional application No. 62/911,981, filed on Oct. 7, 2019.

(51) Int. Cl.

| | |
|---|---|
| ***E06B 9/80*** | (2006.01) |
| ***E06B 9/15*** | (2006.01) |
| ***E06B 9/17*** | (2006.01) |

(52) U.S. Cl.

CPC .................. *E06B 9/80* (2013.01); *E06B 9/15* (2013.01); *E06B 9/17* (2013.01); *E06B 9/17046* (2013.01); *E06B 2009/1544* (2013.01)

(58) Field of Classification Search

CPC ..... E06B 9/80; E06B 9/15; E06B 9/17; E06B 9/17046; E06B 2009/1516; E06B 2009/1555; E06B 2009/1561; E06B 2009/1566; E06B 2009/155

See application file for complete search history.

(56) References Cited

U.S. PATENT DOCUMENTS 3,640,332 A 2/1972 Luby et al.
3,853,166 A 12/1974 Wrono
5,967,216 A * 10/1999 Mancini .................... E06B 9/01 160/209

(Continued)

FOREIGN PATENT DOCUMENTS

CN 106240743 A 12/2016
GB 1093843 A 12/1967

OTHER PUBLICATIONS

First Examination Report mailed in corresponding SA Patent Application No. 522432212 dated Nov. 29, 2022, 13 pages.

(Continued)

*Primary Examiner* — Daniel P Cahn
*Assistant Examiner* — John W Hanes, Jr.

(57) ABSTRACT

A closure system may include a closure movable between an extended state and a retracted state. The closure may be configured to at least partially obstruct an opening in the extended state and allow access through the opening in the retracted state. The closure may include a first portion and a second portion opposite the first portion. The closure may deflect by a first deflection distance when a vertical force is applied to the closure. The closure system may include a strap coupled to the first portion of the closure. The closure with the strap coupled thereto may deflect by a second deflection distance when the vertical force is applied to the closure. The first deflection distance may be at least 100 percent more than the second deflection distance.

25 Claims, 5 Drawing Sheets

(56) References Cited

U.S. PATENT DOCUMENTS

| | | | | |
|---|---|---|---|---|
| 6,062,293 | A | 5/2000 | Berger, Jr. | |
| 6,062,693 | A | 5/2000 | Berger, Jr. | |
| 7,891,401 | B2 * | 2/2011 | Decola | E06B 3/485 160/264 |

OTHER PUBLICATIONS

International Search Report and Written Opinion dated Jan. 26, 2021 for International Patent Application No. PCT/US2020/054375, 11 pages.

* cited by examiner

CLOSURE SYSTEM

CROSS-REFERENCE TO RELATED APPLICATIONS

This application claims the benefit of U.S. Provisional Patent Application No. 62/911,981 filed Oct. 7, 2019 entitled "Closure System", which is incorporated by reference herein in its entirety.

FIELD OF THE INVENTION

The present invention generally relates to closure systems and, more particularly, to a method and system to prevent closure systems from being pried open.

BRIEF SUMMARY OF THE INVENTION

A closure system may include a closure movable between an extended state and a retracted state. The closure may be configured to at least partially obstruct an opening in the extended state and allow access through the opening in the retracted state. The closure may include a first portion and a second portion opposite the first portion. The closure may deflect by a first deflection distance when a vertical force is applied to the closure. The closure system may include a strap coupled to the first portion of the closure. The closure with the strap coupled thereto may deflect by a second deflection distance when the vertical force is applied to the closure. The first distance may be at least 100 percent more than the second deflection distance.

The vertical force may be about 300 pounds. The first distance may be at least 200 percent more than the second distance. The first distance may be at least 300 percent more than the second distance. The first distance may be at least 400 percent more than the second distance. The closure may comprise a plurality of slats, wherein each slat of the plurality of slats may be configured to interlock with another slat of the plurality of slats. The strap may be configured to prevent at least one slat of the plurality of slats from overlapping another slat of the plurality of slats when the vertical force may be applied to the closure. The closure may coil about a shaft as the closure moves from the extended state to the retracted state and more than one slat of the plurality of slats may be fixed to the shaft. The strap may be coupled to at least two slats of the plurality of slats. The second deflection distance may be a maximum of 0.2 inches to about 0.04 inches. The strap may include a rectangular cross-section. The strap may include a height and a width and a ratio of the height to the width may be at least 2:1. The strap may be coupled to the closure by fasteners and the fasteners are exposed on an interior of the closure. The strap may comprise a steel tube. The closure may coil about a shaft as the closure moves from the extended state to the retracted state. The strap may extend vertically from the first portion of the closure toward the shaft.

The strap may prevent the first portion of the closure from coiling about the shaft as the closure moves to the retracted state. The strap may be one of a plurality of straps coupled to the closure. The plurality of straps may be spaced from each other along a width of the closure. At least two of the plurality of straps may be spaced from each other by a distance that may be equal to or greater than a height of one of the at least two of the plurality of straps. The opening may be defined by at least a first sidewall and a second sidewall and the closure may include a guide coupled to at least one of the first sidewall and the second sidewall. At least a portion of the closure may be configured to move within a track defined by the guide as the closure moves between the extended state and the retracted state.

The closure may coil about a shaft as the closure moves from the extended state to the retracted state. The closure may include a height between a ground surface and the shaft and the strap may extend less than 10 percent of the height of the closure.

In a further embodiment, the closure includes a bottom bar coupled to the first portion of the closure and the strap. The closure with the strap and the bottom bar coupled thereto may deflect by a third deflection distance when the vertical force is applied to the closure and the third distance may be at least 10 percent less than the first distance. The bottom bar may comprise a metal angle or a tube. The bottom bar may include a rectangular cross-sectional shape. The bottom bar may be more resistant to deformation in a vertical direction than the strap. The strap may be coupled to the bottom bar with a fastener and the fastener may be exposed on a bottom surface of the bottom bar. The third deflection distance may be a maximum of about 0.01 inches to about 0.03 inches.

In a further embodiment, a method of preventing access through an opening includes coupling a strap to a closure, the closure movable between an extended state and a retracted state, wherein the closure at least partially obstructs the opening in the extended state and allows access through the opening in the retracted state. The closure may be configured to coil about a shaft as the closure moves from the extended state to the retracted state. The closure may deflect by a first deflection distance when a vertical force of 300 pounds may be applied to the closure. The closure with the strap coupled thereto may deflect by a second deflection distance when the vertical force is applied to the closure. The second distance may be at least 5 percent less than the first distance.

In a further embodiment, the method includes coupling a bottom bar to an end of the second portion of the closure, wherein the closure with the strap and bottom bar coupled thereto deflects by a third deflection distance when the vertical force may be applied to the closure. The third distance may be at least 10 percent less than the first distance. The closure may include a plurality of slats and the method may include fixing at least two slats of the plurality of slats to the shaft.

BRIEF DESCRIPTION OF THE SEVERAL VIEWS OF THE DRAWINGS

The foregoing summary, as well as the following detailed description of embodiments of the closure system, will be better understood when read in conjunction with the appended drawings of an exemplary embodiment. It should be understood, however, that the invention is not limited to the precise arrangements and instrumentalities shown. For example, although not expressly stated herein, features of one or more various disclosed embodiments may be incorporated into other of the disclosed embodiments.

In the drawings.

DETAILED DESCRIPTION OF THE EXEMPLARY EMBODIMENTS OF THE INVENTION

Figure 1:
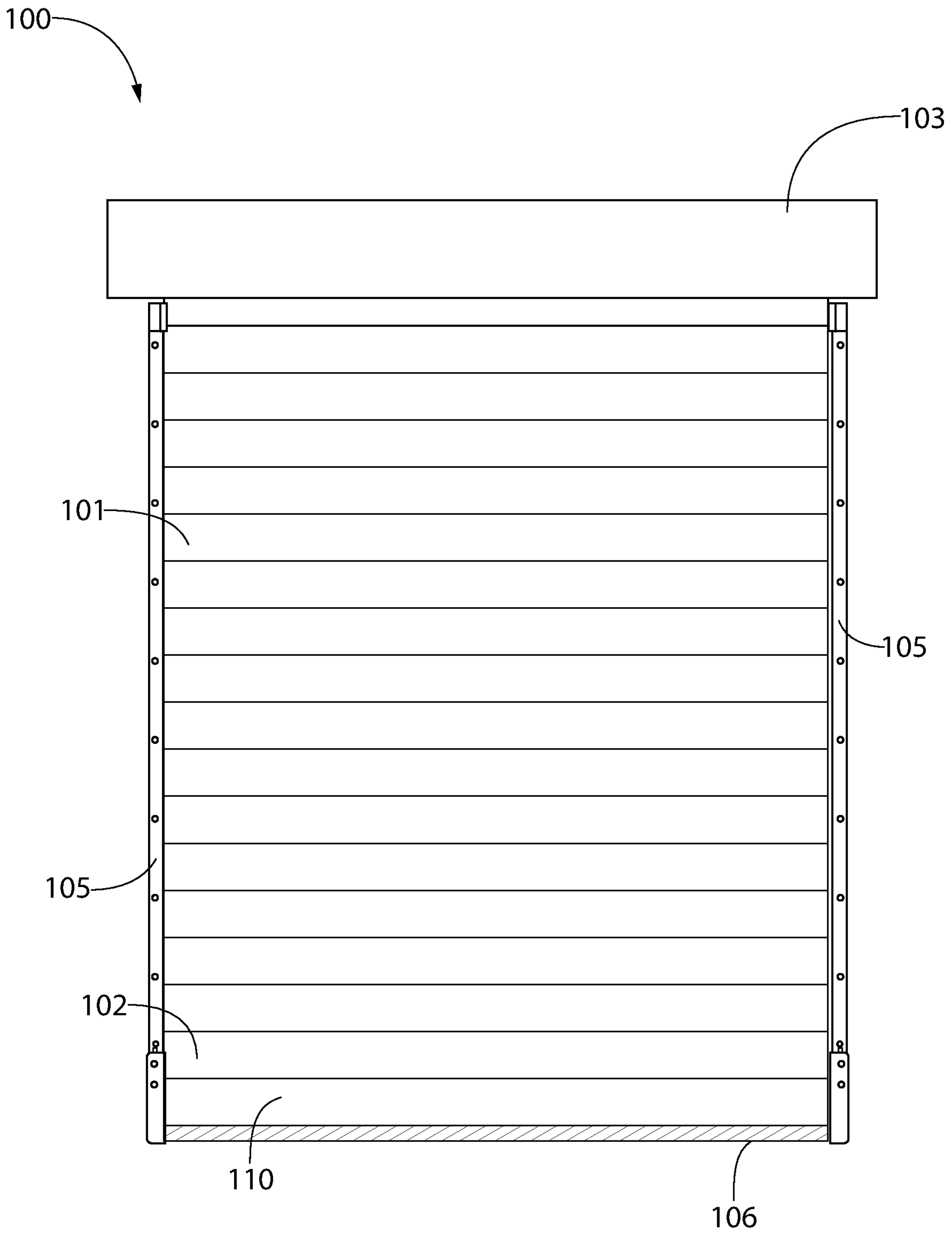
FIG. 1 is a front elevational view of a closure system in accordance with an exemplary embodiment of the present invention.

Referring to the drawings in detail, wherein like reference numerals indicate like elements throughout, there is shown in FIGS. 1-5, a closure system, generally designated 100, in accordance with an exemplary embodiment of the present invention.

Figure 2:
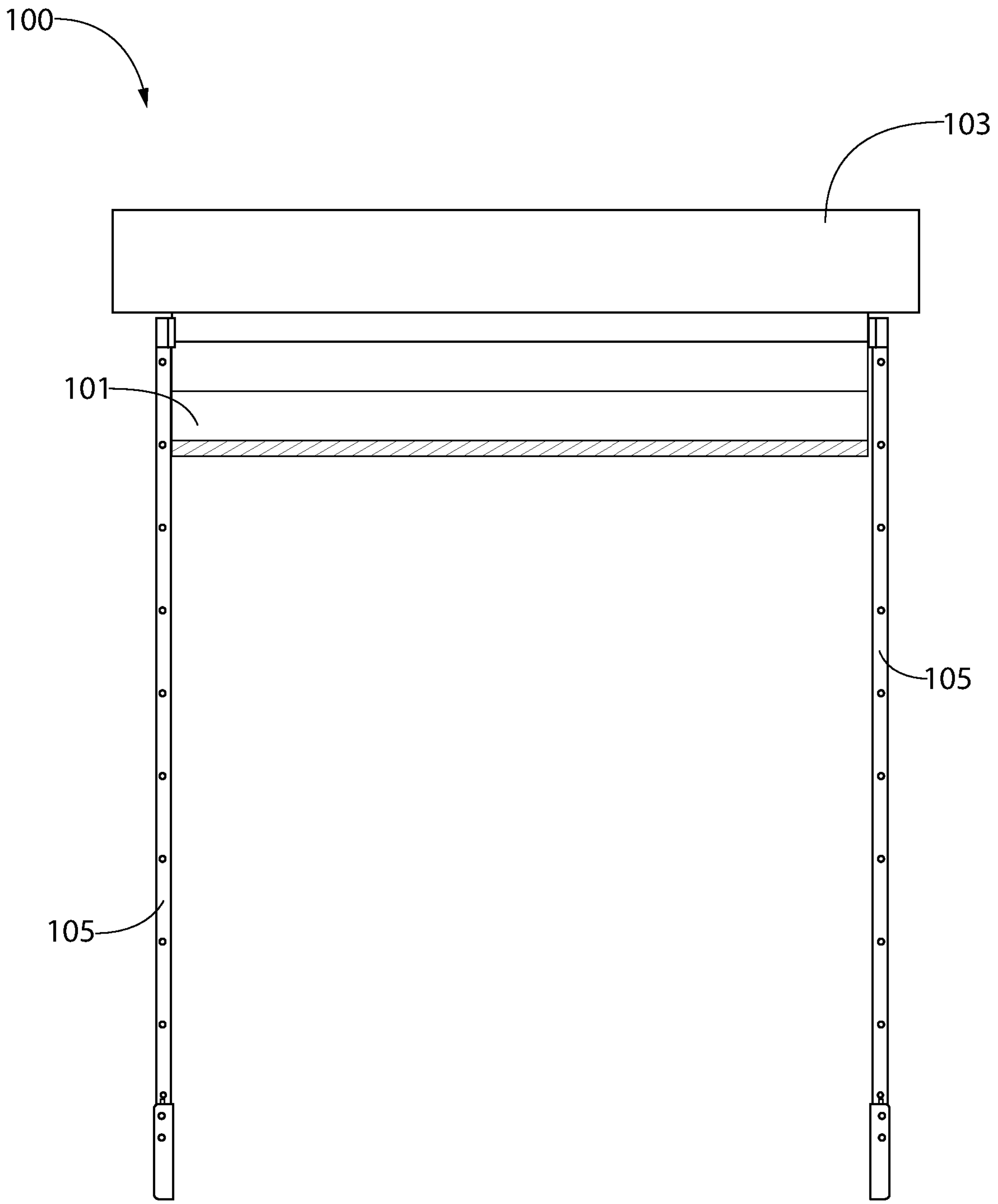
FIG. 2 is a front elevational view of the closure system of FIG. 1 in a retracted state.

Referring to FIG. 1, there is shown a front perspective view of the closure system, generally designated 100. In some embodiments, closure system 100 includes a closure 101 (e.g., a grille, curtain, door) configured to seal or obscure an opening (e.g., a window, doorway, roof opening, accessway). In some embodiments, the opening is defined by at least a first sidewall and a second sidewall. In some embodiments, the closure 101 is moveable from an extended state where the closure 101 prevents the passage of objects (FIG. 1), to a retracted state to allow passage through an opening (FIG. 2). In some embodiments, the closure 101 can be locked in the extended state to prevent unauthorized movement of the closure 101 from the extended state to the retracted state. In some embodiments, a portion of the closure 101 may be within a hood 103 when the closure 101 is in the retracted state, as explained in greater detail below.

In some embodiments, the closure system 100 includes a guide 105 coupled to at least one of the first sidewall and second sidewall. In some embodiments, the closure 101 is configured to move within the guide 105 as the closure 101 moves between the retracted state and the extended state. For example, the guide 105 may define a recess and a portion of the closure 101 may be within the recess as the closure 101 moves between the retracted state and the extended state.

In some embodiments, at least a portion of the closure 101 is flexible such that the closure can be coiled about itself or about a shaft as the closure 101 moves from the extended state to the retracted state. In some embodiments, the closure 101 includes a plurality of slats 102. In some embodiments, each slat 102 of the plurality of slats 102 is configured to interlock with another slat of the plurality of slats. In some embodiments, the slats 102 are configured to flex relative to one another. In some embodiments, slat 102 is configured to rotate or pivot relative to an adjacent slat. In some embodiments, the slats 102 are configured to rotate or flex relative to one another such that the closure can be coiled about itself. In some embodiments, the closure 101 coils about shaft 104 within hood 103 as the closure 101 moves from the extended state to the retracted state.

A flexible closure may save space as it coils about itself for storage but may also be susceptible to allowing unwanted access through the opening. For example, at least a portion of the flexible closure may deflect when a force (e.g., a horizontal or vertical force) is applied to the closure. A space may be created between a side or end of the closure and a surface (e.g., the sidewall or ground) such that a person or object can pass through the opening even when the closure is in the extended position.

Referring to FIGS. 1-4, in some embodiments, the closure 101 includes a rigid element at or near one end (e.g., a bottom) configured to resist deformation when a force is applied to the closure 101. For example, the closure 101 may include a bottom bar 106 that is more rigid than another portion of the closure 101. In some embodiments, the bottom bar 106 is resistant to prying. In some embodiments, the bottom bar 106 has a stiffness of about 500 pounds per inch, about 1,000 pounds per inch, about 1,500 pounds per inch, about 2,000 pounds per inch, about 2,500 pounds per inch, or about 3,000 pounds per inch in a vertical direction when the closure is in the extended position. In some embodiments, the bottom bar 106 extends at least partially into the guide 105 such that the bottom bar 106 resists a horizontal force. In some embodiments, the bottom bar 106 is configured to deflect about 0.01 inches to about 0.1 inches or less than about 1 inch in a vertical direction and about 0.01 inches to about 0.1 inches or less than about 1 inch in a horizontal direction when subjected to a force of up to about 300 pounds.

In some embodiments, the bottom bar 106 may be more resistant to deflection than an adjacent portion of the closure 101. In some embodiments, the bottom bar 106 is more resistant to prying in at least one of the horizontal and vertical directions than the closure 101. In some embodiments, the bottom bar 106 comprises a tube, angle, or I-beam. In some embodiments, the bottom bar 106 includes a rectangular cross-section. In some embodiments, the bottom bar 106 is manufactured from metal (e.g., steel, aluminum, or iron), plastic, or reinforced polymer.

In some embodiments, the closure 101 comprises a plurality of slats 102 and the bottom bar 106 is coupled to one of the slats 102 (e.g., a bottom slat). In some embodiments, the bottom bar 106 is coupled to one of the slats 102 by a fastener, adhesive, or welding. In some embodiments, the closure 101 includes a bottom interface 110. In some embodiments, the bottom interface 110 is more rigid than at least a portion of the closure 101. In some embodiments, the bottom interface 110 is more rigid than at least one of the slats 102.

In some embodiments, slat 102 (e.g., a slat having a length of about 5 feet) is configured to deflect a distance of about 0.04 inches to about 0.1 inches when subjected to a horizontal force (e.g., a force applied with a lever at a point along the length of the slat) of up to about 300 pounds. In some embodiments, slat 102 (e.g., a slat having a length of about 5 feet) is configured to deflect a distance of about 0.005 inches to about 0.05 inches when subjected to a vertical force (e.g., a force applied with a lever at a point along the length of the slat) of up to about 300 pounds. In some embodiments, slat 102 (e.g., a slat having a length of about 10 feet) is configured to deflect a distance of about 0.0.1 inches to about 0.7 inches when subjected to a horizontal force (e.g., a force applied with a lever at a point along the length of the slat) of up to about 300 pounds. In some embodiments, slat 102 (e.g., a slat having a length of about 10 feet) is configured to deflect a distance of about 0.0.1 inches to about 0.5 inches when subjected to a vertical force (e.g., a force applied with a lever at a point along the length of the slat) of up to about 300 pounds. In some embodiments, slat 102 (e.g., a slat having a length of about 15 feet) is configured to deflect a distance of about 0.75 inches to about 1.75 inches when subjected to a horizontal force (e.g., a force applied with a lever at a point along the length of the slat) of up to about 300 pounds. In some embodiments, slat 102 (e.g., a slat having a length of about 15 feet) is configured to deflect a distance of about 0.25 inches to about 0.75 inches when subjected to a vertical force (e.g., a force applied with a lever at a point along the length of the slat) of up to about 300 pounds.

In some embodiments, bottom interface 110 is configured to deflect a distance of about 0.1 inches to about 0.5 inches, or less than about 1 inch, in the vertical direction and about 0.25 inches to about 0.75 inches, or less than about 1 inch in the horizontal direction when subjected to a force of up to about 300 pounds. In some embodiments, slat 102 and bottom interface 110 are configured to deflect a distance of about 0.25 inches to about 0.75 inches, or less than about 1 inch, in a horizontal direction and about 0.1 inches to about 0.75 inches, or less than about 1.5 inches in a vertical direction when subjected to a force of up to about 300 pounds.

In some embodiments, slat 102, bottom interface 110, and bottom bar 106 form a closure 101 (e.g., a closure having a length of about 5 feet) is configured to deflect a distance of about 0.005 inches to about 0.03 inches when subjected to a horizontal force (e.g., a force applied with a lever at a point along the length of the slat) of up to about 300 pounds. In some embodiments, closure 101 (e.g., a closure having a length of about 5 feet) is configured to deflect a distance of about 0.005 inches to about 0.03 inches when subjected to a vertical force (e.g., a force applied with a lever at a point along the length of the slat) of up to about 300 pounds. In some embodiments, closure 101 (e.g., a closure having a length of about 10 feet) is configured to deflect a distance of about 0.04 inches to about 0.12 inches when subjected to a horizontal force (e.g., a force applied with a lever at a point along the length of the slat) of up to about 300 pounds. In some embodiments, closure 101 (e.g., a closure having a length of about 10 feet) is configured to deflect a distance of about 0.05 inches to about 0.15 inches when subjected to a vertical force (e.g., a force applied with a lever at a point along the length of the slat) of up to about 300 pounds. In some embodiments, In some embodiments, closure 101 (e.g., a closure having a length of about 15 feet) is configured to deflect a distance of about 0.15 inches to about 0.5 inches when subjected to a horizontal force (e.g., a force applied with a lever at a point along the length of the slat) of up to about 300 pounds. In some embodiments, closure 101 (e.g., a closure having a length of about 15 feet) is configured to deflect a distance of about 0.25 inches to about 0.45 inches when subjected to a vertical force (e.g., a force applied with a lever at a point along the length of the slat) of up to about 300 pounds.

Figure 3:
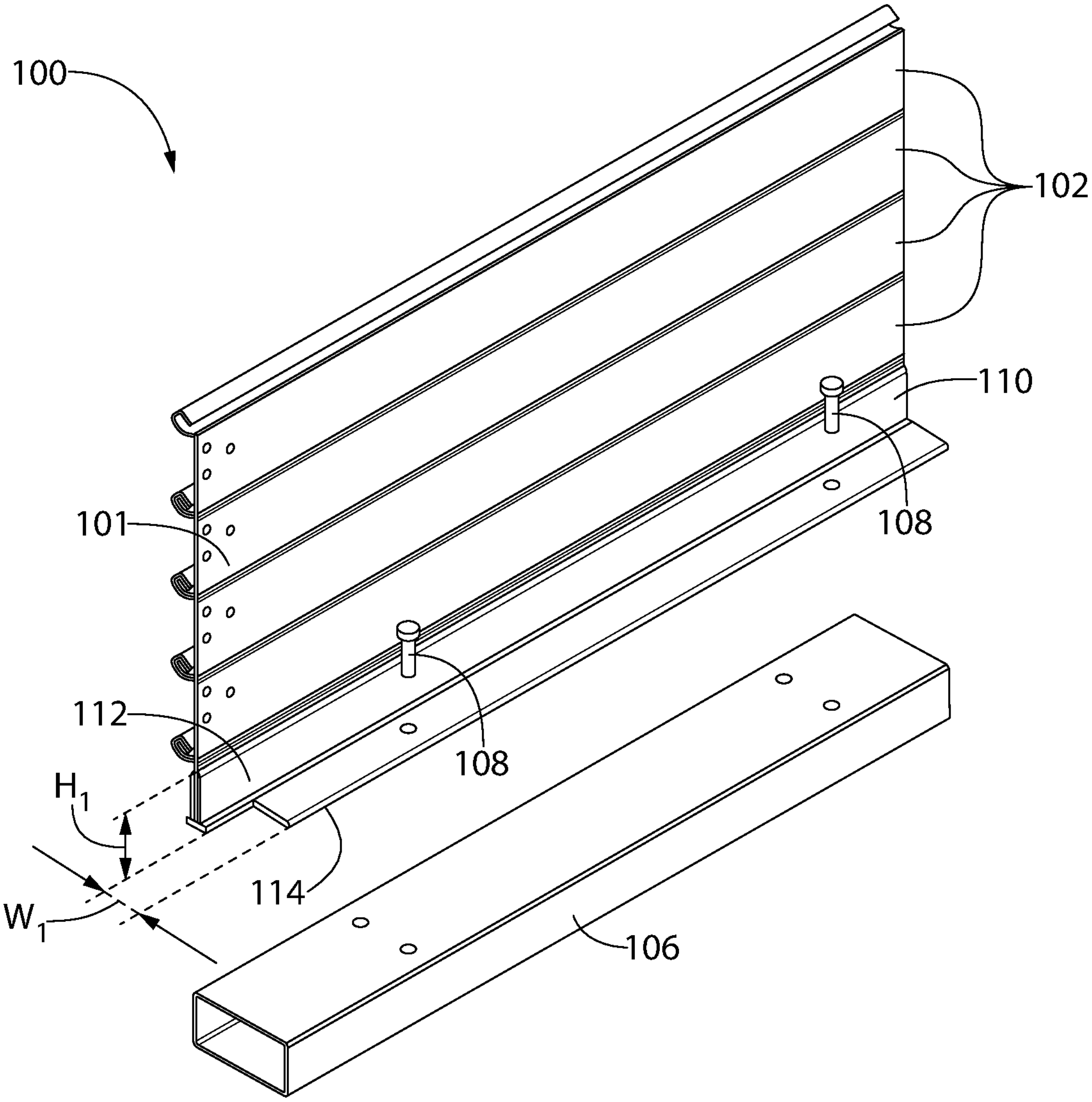
FIG. 3 is an exploded view of a portion of the closure system of FIG. 1.

Referring to FIG. 3, in some embodiments, the bottom interface 110 includes a first portion 112 and a second portion 114. In some embodiments, the bottom interface 110 includes a width that extends from a first guide coupled to a sidewall to a second guide coupled to an opposite sidewall. In some embodiments, the bottom interface 110 includes a height $H_1$ and a width $W_1$. In some embodiments, the first portion 112 is coupled to a bottom slat 102. In some embodiments, the first portion 112 extends vertically and comprises a majority of the height of the bottom interface 110. In some embodiments, the second portion 114 extends horizontally away from the first portion 112 and forms a majority of the width of the bottom interface 110. In some embodiments, the second portion 114 extends horizontally away from one side of the first portion 112. In some embodiments, the second portion 114 extends horizontally away from both sides (e.g., front and back) of the first portion 112.

Referring to FIG. 3, in some embodiments, the closure system 100 includes a fastener 108 configured to couple the bottom bar 106 to the bottom interface 110. For example, the fastener 108 may be a bolt, threaded fastener, or rivet. In some embodiments, the bottom bar 106 is detachably coupled to the bottom interface 110 via the fastener 108. In some embodiments, the bottom bar 106 is detachably coupled to the bottom interface 110 via the fastener 108 and the fastener is exposed on a bottom surface of the bottom bar 106. In some embodiments, the bottom bar 106 is welded or attached to the bottom interface 110 with adhesive. In some embodiments, the bottom interface 110 is less rigid than the bottom bar 106. In some embodiments, the bottom bar 106 is about 50%, about 100%, about 150%, about 200%, about 300%, about 400%, about 500%, about 600%, about 700%, about 800%, about 900%, or about 1,000% more resistant to a force (e.g., a vertical or horizontal force) than the bottom interface 110. For example, a defection distance when a force (e.g., a vertical force) is applied to the bottom bar 106 may be about 50%, about 100%, about 150%, about 200%, about 300%, about 400%, about 500%, about 600%, about 700%, about 800%, about 900%, or about 1,000% less than a deflection distance when the force is applied to the bottom interface 110.

In some embodiments, a localized portion (e.g., a portion of the length between the guides) of the bottom interface 110 can be forced upwardly when subjected to a sufficient force (e.g., a force above a threshold). In some embodiments, the bottom bar 106 coupled to the bottom interface 110 or closure 101 results in a structure that can withstand a maximum prying force that can be applied when using hand tools (e.g., a crow bar or pry bar) and deform less than about 12 inches, about 11 inches, about 10 inches, about 9 inches, about 8 inches, about 7 inches, about 6 inches, about 5 inches, about 4 inches, about 3 inches, about 2 inches, or about 1 inch. In some embodiments, a hand tool may generate a force of about 150 pounds to about 450 pounds, or about 300 pounds.

The slats of existing closures may be forced to at least partially overlap each other when the closure is in an extended state and a sufficient force (e.g., an upward force) is applied. The slats of existing closures may be forced to overlap each other when an upward force is applied to the bottom bar even if the bottom bar does not deform. For example, the bottom bar may maintain its shape when a force is applied but the entire bottom bar or one side of the bottom bar may be lifted such that the slats above the bottom bar overlap each other. The overlapping of slats may create enough space between the bottom bar and the surface (e.g., ground or sidewall) to allow an unauthorized person or object to enter through the opening while the closure is in the extended state.

Figure 4:
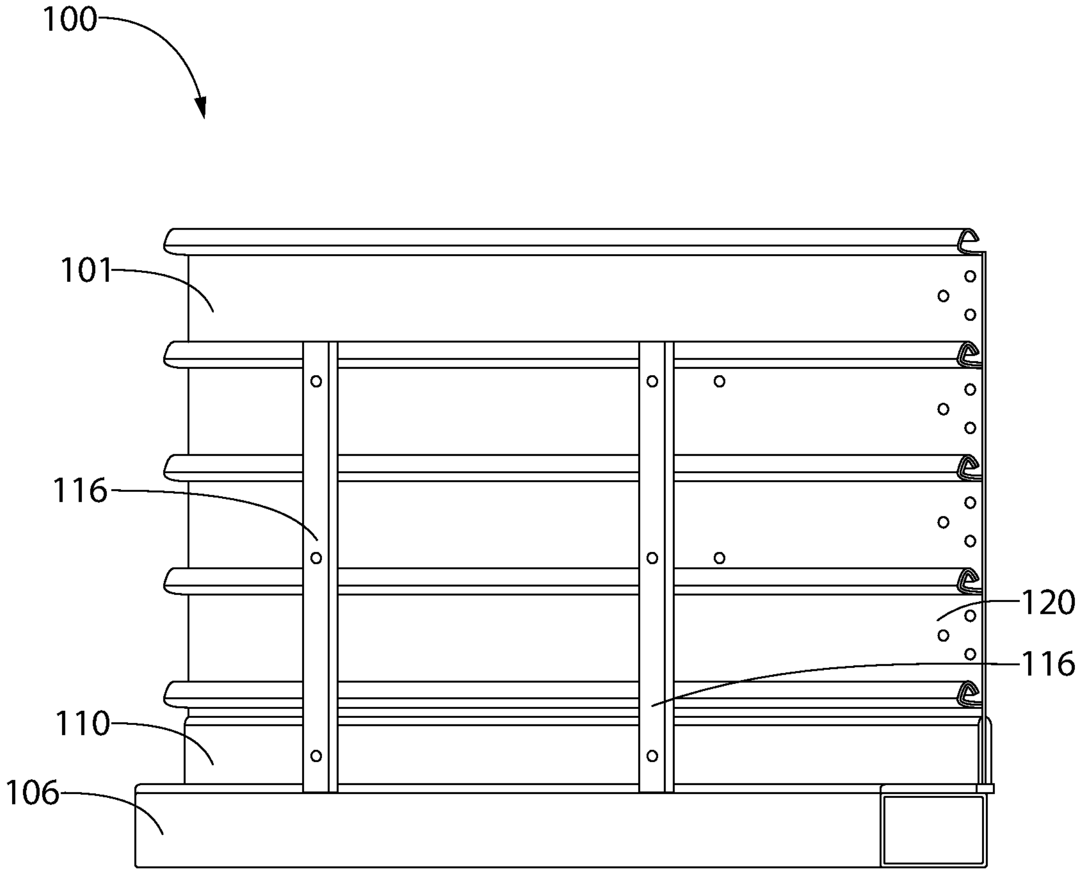
FIG. 4 is a rear perspective view of a portion of the closure system of FIG. 1.

Referring to FIGS. 3-4, in some embodiments, the closure system 100 includes one or more straps 116 (e.g., compression preventing straps) configured to prevent the closure 101 from misaligning or overlapping on itself when subjected to a force (e.g., a prying force). For example, the strap 116 may be attached to a first portion or lower portion 117 of the closure 101 such that the combination of the closure 101 and strap 116 resist prying force. In some embodiments, the first portion or lower portion 117 includes the portion of the closure 101 most likely to deflect or deform when a force is applied to the closure (e.g., a prying force applied with a lever along a length of the closure).

In some embodiments, the strap 116 is coupled to the closure 101 via adhesive, welding, or fastener. In some embodiments, the strap 116 is coupled to the closure 101 by a fastener 118. In some embodiments, the fastener 118 is exposed on an interior of the closure 101. In some embodiments, strap 116 is coupled to the bottom bar 106 by fastener 108. In some embodiments, the strap 116 is fixed to the lower portion 117 of the closure 101 and is configured to resist compression when an upward force is applied to the bottom bar 106 or bottom interface 110. In some embodiments, the strap 116 is coupled to the lower portion 117 of the closure 101 and is configured to resist shearing when a transverse (e.g., vertical) force is applied to the closure 101, bottom bar 106, or bottom interface 110. In some embodiments, the strap 116 is coupled to the lower portion 117 of the closure 101 and is configured to resist compression and shearing when a force is applied to the closure 101, bottom bar 106, or bottom interface 110.

In some embodiments, the strap 116 is coupled to one or more of the bottom bar 106, bottom interface 110, and one or more slats 102. In some embodiments, the strap 116 is coupled or fixed to a plurality of slats 102. In some embodiments, slats 102 in a first portion of the closure 101 are manufactured from a first material and the slats 102 in a second portion of the closure 101 are manufactured from a second material. In some embodiments, the first portion is the lower portion 117 of the closure. In some embodiments, the first material is stronger (e.g., more resistant to compression or shear) than the second material. In other embodiments, the first material and the second material are the same. In some embodiments, the first material and second material are the same but the slats 102 in the first portion 112 have different geometric properties (e.g., thickness or solidity) from the slats in the second portion such that the slats in the first portion are stronger than the slats in the second portion.

In some embodiments, strap 116 comprises a metal bar, steel tubing, rebar, wood, or polymer. In some embodiments, strap 116 includes a rectangular cross-section. In some embodiments, strap has a height of about 4 inches, about 6 inches, about 8 inches, about 10 inches, about 12 inches, about 14 inches, about 16 inches, about 18 inches, about 20 inches, about 22 inches, about 24 inches, about 30 inches, or about 36 inches. In some embodiments, strap 116 has width of about 0.5 inches, about 1 inch, about 1.5 inches, about 2 inches, about 2.5 inches, about 3 inches, about 3.5 inches, about 4 inches, about 4.5 inches, about 5 inches, about 5.5 inches, or about 6 inches. In some embodiments, strap 116 has a thickness of about 0.1 inches, about 0.2 inches, about 0.25 inches, about 0.3 inches, about 0.4 inches, about 0.5 inches, about 0.75 inches, about 1.0 inches, about 1.25 inches, or about 1.5 inches. In some embodiments, the strap 116 includes a height and a width and a ratio of the height to the width is at least about 10:1, 9:1, 8:1, 7:1, 6:1, 5:1, 4:1, 3:1, 2:1, or about 1:1. In some embodiments, strap 116 is a steel bar with dimensions of ¼"×1"×12". In some embodiments, the closure 101 includes a height as measured between a ground surface and the shaft 104 and the strap 116 has a strap length that is less than about 50%, 40%, 30%, 20%, 10%, or about 5% of the height of the closure 101.

In some embodiments, strap 116 has a tensile strength of about 25,000 pounds per square inch (psi) to about 75,000 psi, or about 50,000 psi. In some embodiments, the strap 116 has a shear modulus of about 10,000 kilopounds per square inch (ksi) to about 15,000 ksi, or about 12,000 ksi. In some embodiments, strap 116 extends vertically from the bottom interface 110 or bottom bar 106. In other embodiments, strap 116 extends away from the bottom interface 110 or bottom bar 106 along an axis transverse to the bottom interface 110 or bottom bar 106.

In some embodiments, slat 102, bottom interface 110, and strap 116 form a closure 101 (e.g., a closure having a length of about 5 feet) is configured to deflect a horizontal distance of about 0.04 inches to about 0.08 inches when subjected to a force (e.g., a force applied with a lever at a point along the length of the slat) of up to about 300 pounds. In some embodiments, closure 101 (e.g., a closure having a length of about 5 feet) is configured to deflect a vertical distance of about 0.01 inches to about 0.03 inches when subjected to a force (e.g., a force applied with a lever at a point along the length of the slat) of up to about 300 pounds. In some embodiments, closure 101 (e.g., a closure having a length of about 10 feet) is configured to deflect a vertical distance of about 0.25 inches to about 0.5 inches when subjected to a force (e.g., a force applied with a lever at a point along the length of the slat) of up to about 300 pounds. In some embodiments, closure 101 (e.g., a closure having a length of about 10 feet) is configured to deflect a vertical distance of about 0.01 inches to about 0.05 inches when subjected to a force (e.g., a force applied with a lever at a point along the length of the slat) of up to about 300 pounds. In some embodiments, closure 101 (e.g., a closure having a length of about 15 feet) is configured to deflect a horizontal distance of about 0.8 inches to about 1.4 inches when subjected to a force (e.g., a force applied with a lever at a point along the length of the slat) of up to about 300 pounds. In some embodiments, closure 101 (e.g., a closure having a length of about 15 feet) is configured to deflect a vertical distance of about 0.04 inches to about 0.08 inches when subjected to a force (e.g., a force applied with a lever at a point along the length of the slat) of up to about 300 pounds.

In some embodiments, a plurality of straps 116 are attached to and spaced along a width (e.g., a width measured as the distance between the first sidewall and second sidewall of the opening) of closure 101. In some embodiments, at least two straps of the plurality of straps 116 are spaced from each other by a distance that is equal to or greater than a height of one of the straps 116. In some embodiments, straps 116 are spaced along the width of the closure 101 but are oriented such that at least two straps 116 are transverse to or overlap each other.

In some embodiments, the closure 101 by itself deflects a first deflection distance when a vertical force is applied to the closure. In some embodiments, the vertical force is about 100 pounds, about 200 pounds, about 300 pounds, about 400 pounds, about 500 pounds, about 600 pounds, about 700 pounds, about 800 pounds, about 900 pounds, about 1,000 pounds, about 100 to about 300 pounds, about 300 pounds to about 500 pounds, about 500 pounds to about 750 pounds, about 750 pounds to about 1,000 pounds, less than 1,000 pounds, or greater than 1,000 pounds. In some embodiments, the closure with the strap 116 coupled thereto deflects by a second distance when the vertical force is applied to the closure. In some embodiments, the second distance is at least about 100%, 90%, 80%, 70%, 60%, 50% 40%, 30%, 20%, 10%, or about 5% less than the first distance. In some embodiments, the closure with the strap 116 and the bottom bar 106 coupled thereto deflects by a third distance when the vertical force is applied to the closure. In some embodiments, the second distance is at least about 100%, 90%, 80%, 70%, 60%, 50%, 40%, 30%, 20%, 10%, or about 5% less than the first distance. In some embodiments, the third distance is at least about 100%, 90%, 80%, 70%, 60%, 50% 40%, 30%, 20%, 10%, or about 5% less than the first distance. In some embodiments, the first deflection distance is a maximum of about 0.2 inches to about 0.6 inches in a vertical direction when the closure 101 has a width of about 8 feet to about 12 feet or about 10 feet and the closure 101 is subjected to a force of about 300 pounds. In some embodiments, the second deflection distance is a maximum of about 0.02 inches to about 0.04 inches in a vertical direction when the closure 101 has a width of about 8 feet to about 12 feet or about 10 feet and the closure 101 is subjected to a force of about 300 pounds. In some embodiments, the third deflection distance is a maximum of about 0.01 inches to about 0.03 inches in a vertical direction when the closure 101 has a width of about 8 feet to about 12 feet or about 10 feet and the closure 101 is subjected to a force of about 300 pounds.

In some embodiments, closure 101 (e.g., a closure having a length of about 5 feet) includes slat 102, bottom interface 110, bottom bar 106, and strap 116 and is configured to deflect a horizontal distance of about 0.05 inches to about 0.0015 inches when subjected to a force (e.g., a force applied with a lever at a point along the length of the slat) of up to about 300 pounds. In some embodiments, closure 101 (e.g., a closure having a length of about 5 feet) is configured to deflect a vertical distance of about 0.05 inches to about 0.0015 inches when subjected to a force (e.g., a force applied with a lever at a point along the length of the slat) of up to about 300 pounds. In some embodiments, closure 101 (e.g., a closure having a length of about 10 feet) is configured to deflect a horizontal distance of about 0.0.04 inches to about 0.1 inches when subjected to a force (e.g., a force applied with a lever at a point along the length of the slat) of up to about 300 pounds. In some embodiments, closure 101 (e.g., a closure having a length of about 10 feet) is configured to deflect a vertical distance of about 0.01 inches to about 0.03 inches when subjected to a force (e.g., a force applied with a lever at a point along the length of the slat) of up to about 300 pounds. In some embodiments, closure 101 (e.g., a closure having a length of about 15 feet) is configured to deflect a horizontal distance of about 0.1 inches to about 0.4 inches when subjected to a force (e.g., a force applied with a lever at a point along the length of the slat) of up to about 300 pounds. In some embodiments, closure 101 (e.g., a closure having a length of about 15 feet) is configured to deflect a vertical distance of about 0.02 inches to about 0.06 inches when subjected to a force (e.g., a force applied with a lever at a point along the length of the slat) of up to about 300 pounds.

In some embodiments, closure 101 is configured to prevent a person from forcing their way (e.g., with a crow bar, pry bar, sledge hammer, lever, or manual tool) through the opening for a selected period of time. In some embodiments, one or more of slat 102, bottom interface 110, bottom bar 106, and strap 116 may compress or deform when a force is applied to the closure 101 but a space between closure 101 and the sidewall or ground is too small for a person to fit through even when someone tries to force their way (e.g., with a crow bar, pry bar, sledge hammer, lever, or manual tool) through the opening for a selected period of time. In some embodiments, the selected period of time is at least 1 minute, 5 minutes, 10 minutes, 15 minutes, 20 minutes, 30 minutes, 40 minutes, 50 minutes, or 60 minutes.

Figure 5:
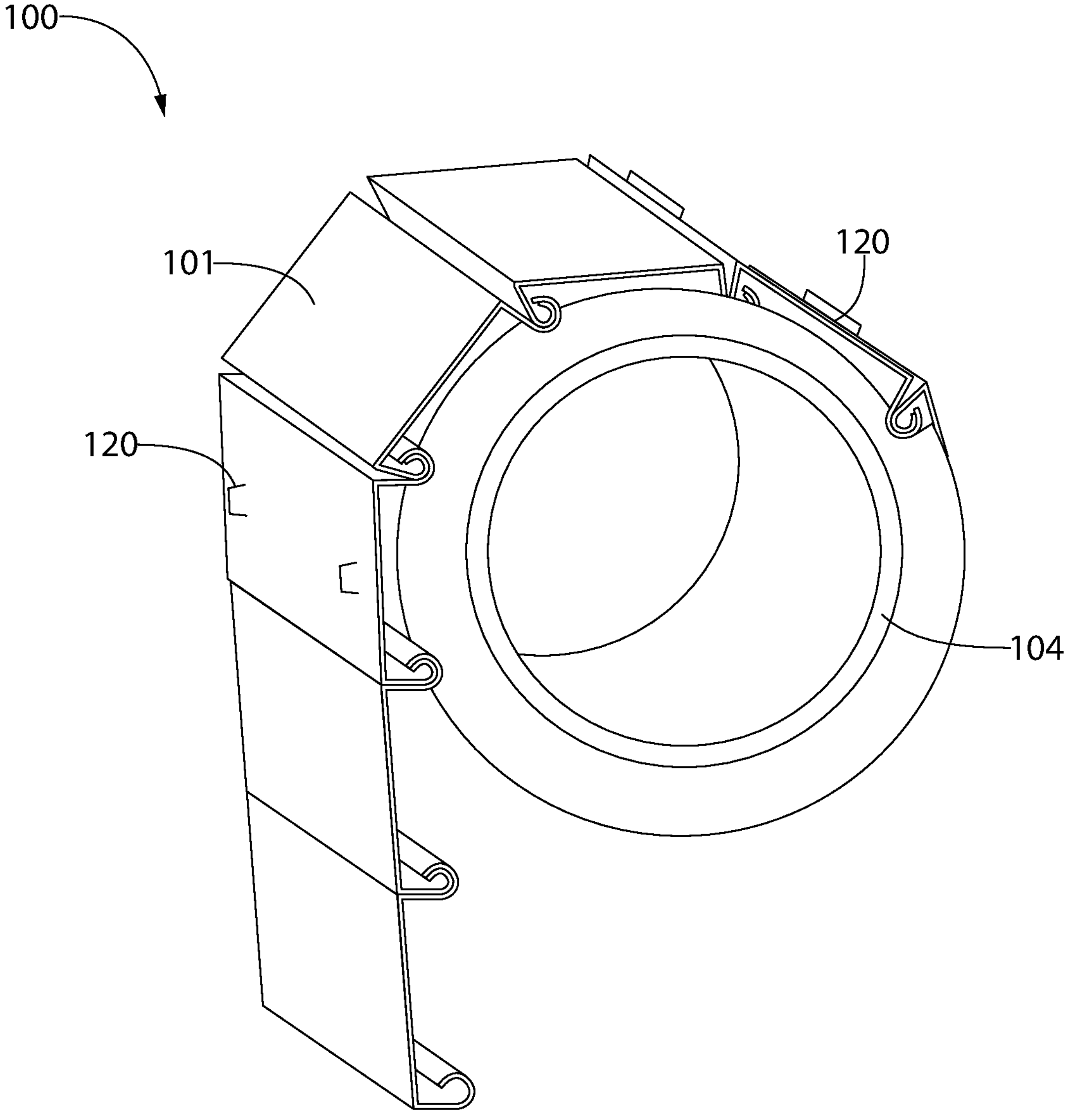
FIG. 5 is a side perspective view of a portion of the closure system of FIG. 1 coupled to a shaft.

Existing closure systems may coil about a shaft as the closure moves from a closed configuration to an open configuration. However, existing closure systems may be lifted, allowing the free hanging slats to loop over the shaft even if the closure does not deform or overlap on itself (e.g., wherein the slats do not remain in the same plane), thereby allowing unauthorized access through the opening. Referring to FIG. 5, in some embodiments, closure 101 is fixed to shaft 104 to prevent the closure 101 from looping over the shaft 104 when an upward force is applied to the closure 101. In some embodiments, closure 101 is fixed to shaft 104 by an anchor 120 (e.g., threaded fastener, self-drilling screw, adhesive, weld, or rivet). In some embodiments, a first anchor 120 couples a first portion of the closure 101 to shaft 104 and a second anchor 120 couples a second portion of the closure 101 to the shaft 104. In some embodiments, the first anchor is circumferentially spaced about a centerline of the shaft 104 from the second anchor 120 about 180 degrees, about 150 degrees, about 120 degrees, about 90 degrees, about 60 degrees, or about 30 degrees. In some embodiments, the strap 116 prevents at least a portion of the closure 101 from coiling about the shaft 104.

In some embodiments, one or more of strap 116, bottom bar 106, and anchor 120 may be retrofit onto to an existing closure. In some embodiments, one or more of strap 116, bottom bar 106, and anchor 120 may be retrofit onto to an existing closure while the closure is in place.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and various features of the disclosed embodiments may be combined. The words “lower” and “upper” designate directions in the drawings to which reference is made. The words “inwardly” and “outwardly” refer to directions toward and away from, respectively, the geometric center of the closure system. Unless specifically set forth herein, the terms “a”, “an” and “the” are not limited to one element but instead should be read as meaning “at least one”.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the methods of the present invention do not rely on the particular order of steps set forth herein, the particular order of the steps should not be construed as limitation on the claims. Any claims directed to the methods of the present invention should not be limited to the performance of their steps in the order written, and one skilled in the art can readily appreciate that the steps may be varied and still remain within the spirit and scope of the present invention.

I claim:

1. A closure system comprising:

a closure, wherein the closure is configured to at least partially obstruct an opening in an extended state and allow access through the opening in a retracted state, the closure comprising:

a plurality of slats;

a bottom interface, wherein the bottom interface comprises a first portion and a second portion that extends horizontally away from the first portion; and a bottom bar coupled to the second portion of the bottom interface, wherein the closure deflects by a first deflection distance when a vertical force is applied to the closure; and a strap coupled to the first portion of the bottom interface and at least two slats of the plurality of slats that are closest to the bottom interface, wherein the closure with the strap coupled thereto deflects by a second deflection distance when the vertical force is applied to the closure, wherein the first deflection distance is at least 100 percent more than the second deflection distance, wherein the closure is movable between the extended state and the retracted state while the strap is coupled to the first portion of the bottom interface and the at least two slats of the plurality of slats.

2. The closure system of claim 1, wherein the vertical force is about 300 pounds.

3. The closure system of claim 1, wherein the first deflection distance is at least 200 percent more than the second deflection distance.

4. The closure system of claim 1, wherein the first deflection distance is at least 300 percent more than the second deflection distance.

5. The closure system of claim 1, wherein the first deflection distance is at least 400 percent more than the second deflection distance.

6. The closure system of claim 1, wherein each slat of the plurality of slats is configured to interlock with another slat of the plurality of slats.

7. The closure system of claim 6, wherein the strap is configured to prevent at least one slat of the plurality of slats from overlapping another slat of the plurality of slats when the vertical force is applied to the closure.

8. The closure system of claim 6, wherein the closure coils about a shaft as the closure moves from the extended state to the retracted state and more than one slat of the plurality of slats is fixed to the shaft.

9. The closure system of claim 1, wherein the second deflection distance is 0.04 inches to 0.2 inches.

10. The closure system of claim 1, wherein the strap includes a rectangular cross-section.

11. The closure system of claim 1, wherein the strap includes a height and a width and a ratio of the height to the width is at least 2:1.

12. The closure system of claim 1, wherein the strap is coupled to the closure by fasteners and the fasteners are exposed on an interior of the closure.

13. The closure system of claim 1, wherein the strap comprises a steel tube.

14. The closure system of claim 1, wherein the closure coils about a shaft as the closure moves from the extended state to the retracted state and the strap extends vertically from the first portion of the bottom interface toward the shaft.

15. The closure system of claim 14, wherein the strap prevents the first portion of the bottom interface from coiling about the shaft as the closure moves to the retracted state.

16. The closure system of claim 1, wherein the strap is one of a plurality of straps coupled to the closure.

17. The closure system of claim 16, wherein the plurality of straps are spaced from each other along a width of the closure.

18. The closure system of claim 17, wherein at least two of the plurality of straps are spaced from each other by a distance that is equal to or greater than a height of one of the at least two of the plurality of straps.

19. The closure system of claim 1, wherein the opening is defined by at least a first sidewall and a second sidewall, wherein the closure further comprises a guide coupled to at least one of: the first sidewall or the second sidewall, wherein at least a portion of the closure is configured to move within a track defined by the guide as the closure moves between the extended state and the retracted state.

20. The closure system of claim 19, wherein the closure coils about a shaft as the closure moves from the extended state to the retracted state and the closure includes a height between a ground surface and the shaft, and wherein the strap extends less than 10 percent of the height of the closure.

21. The closure system of claim 1, wherein the closure with the strap and the bottom bar coupled thereto deflects by a third deflection distance when the vertical force is applied to the closure and the third deflection distance is at least 10 percent less than the first deflection distance.

22. The closure system of claim 21, wherein the bottom bar comprises a metal angle or a tube.

23. The closure system of claim 21, wherein the bottom bar includes a rectangular cross-sectional shape.

24. The closure system of claim 21, wherein the bottom bar is more resistant to deformation in a vertical direction than the strap.

25. The closure system of claim 21, wherein the third deflection distance is a maximum of about 0.01 inches to about 0.03 inches.

* * * * *